Jan. 11, 1966  J. R. TUSSON  3,228,121
STUDY MACHINE
Filed Dec. 11, 1961
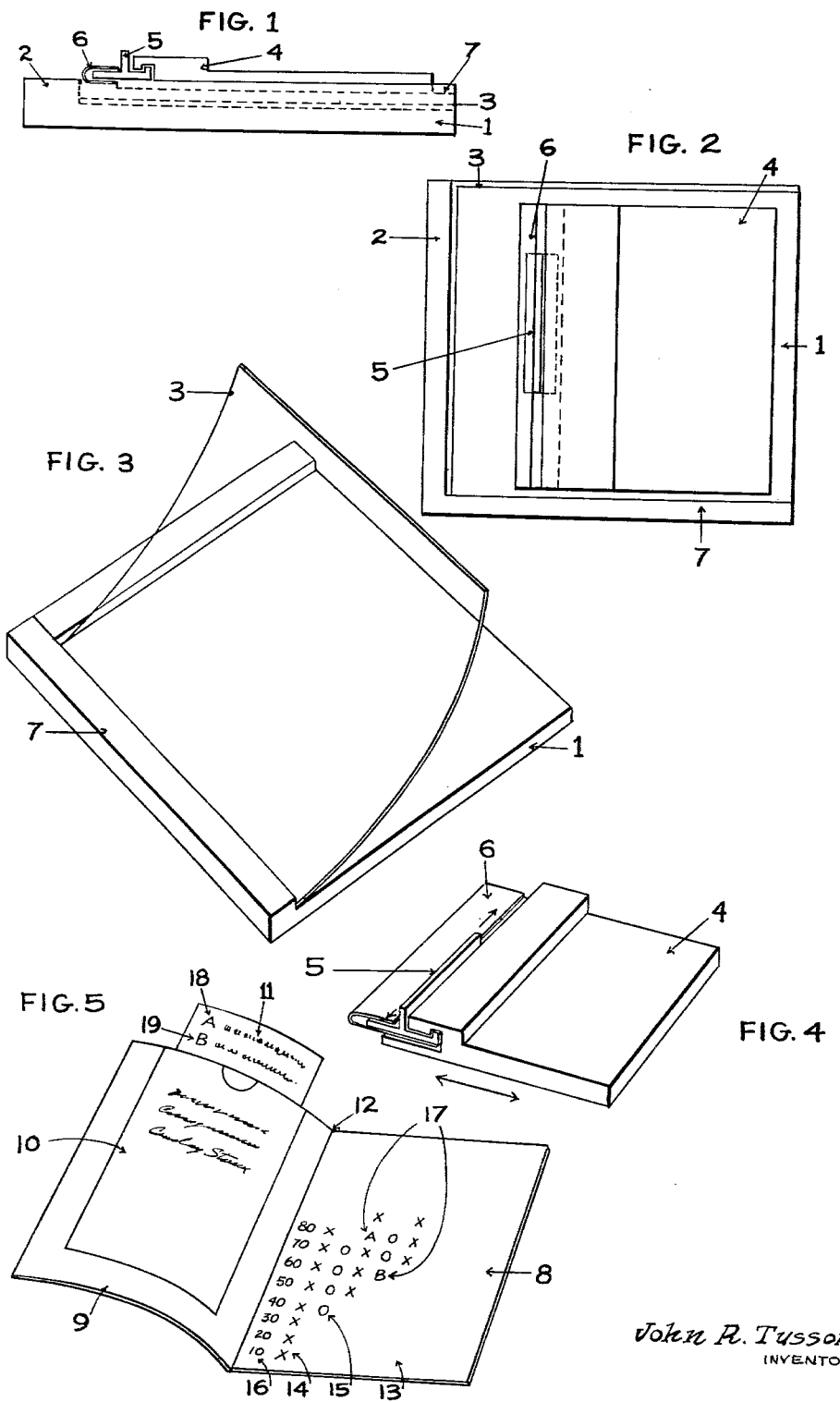
John R. Tusson
INVENTOR United States Patent Office 3,228,121
Patented Jan. 11, 1966

3,228,121
STUDY MACHINE
John R. Tusson, Belle Chasse, La.
(708 Carondelet Bldg., New Orleans 12, La.)
Filed Dec. 11, 1961, Ser. No. 158,398
5 Claims. (Cl. 35—24)

This invention relates to a machine for use to acquire knowledge and skill in the process of making decisions for the purpose of buying, selling, holding, predicting stop loss points, short selling, placing of put and call options and other functions related to the selection of positions to be taken with respect to investments from both a fundamental and a technical standpoint. Fundamental information means primarily those factors related to the financial status of a company such as price earnings ratio (price of stock divided by earnings per share), percentage growth in earnings per share over a period of several years, sales volume, nature of business in which the company is engaged, the yield paid in dividends. Releases of fundamental information about the particular company or about the particular industry can have an effect on the stock price.

Technical information relates to the price movements and patterns resulting from announcements concerning fundamentals plus emotional elements affecting the market in general.

A primary object of the invention is to provide a machine for use to enable the operator to increase his skill and knowledge in the making of decisions in a matter of weeks that he normally would acquire from years of practice in the actual stock market. This is accomplished through the use of authentic fundamental and technical information revealed to the operator by the machine as it actually happened without his foreknowledge of the nature of the information.

Another important object of the invention is to teach the operator of the machine the interpretation of technical and fundamental information related to the stock market.

A further important object of the invention is to provide a machine which allows the operator to accumulate knowledge as to the formations and chart patterns of technical information and how these patterns can predict the future movement of the prices of particular stocks.

With the foregoing and other objects in view which will appear as the description proceeds, the invention consists of a novel machine consisting of a combination of parts, hereinafter more fully described and pointed out in the claims, it being understood that changes may be made in the construction and arrangement of the parts without departing from the spirit of the invention as claimed.

Referring to the drawing:

FIGURE 1 is a side view of one possible design of the invention showing one type of arrangement of the component parts.

FIGURE 2 is a plan view thereof.

FIGURE 3 is a diagrammatic view of the chart board 1 of FIGURE 1.

FIGURE 4 is a diagrammatic view of the cover board 4.

FIGURE 5 is a schematic representation of the folder 9 containing the fundamental and technical information relating to a particular stock that is inserted in the machine for study by the operator.

Referring to the drawings in detail, the reference character 1 indicates the chart board on which the folder 9 containing the fundamental and technical information is inserted as further described below. Attached to the chart board 1 is a clear plastic sheet 3 used to cover the technical information of the folder 9 and to hold it in place on the chart board 1. The left raised edge 2 of the chart board 1 is used for lining up the left edge 12 of the folder 9. The bottom raised edge 7 of the chart board 1 is used for lining up the bottom edge 13 of the folder 9.

The cover board 4 is a separable piece from the chart board 1 and is used to cover the technical chart portion 8 of the folder 9 to prevent the operator thereof from viewing the price movements of the stock prematurely.

Slide 5 rides in a clear plastic envelope 6 in an up and down movement to cover symbols 14 and 15 on the technical chart portion 8 of the folder 9. The folder 9 is one piece and includes the envelope containing the fundamental sheet, or chart, 11, and the technical chart portion 8. The folder is folded at the crease 12 and when closed, the front sheet and the envelope 10 cover the technical chart portion 8.

On the inside front sheet of folder 9 is an envelope 10 from which is drawn-out a chart, or sheet 11 containing the fundamental information relating to a particular stock. The technical information showing price movements for the same stock is supplied by the symbols 14 and 15 on the technical chart portion 8 of the folder 9.

"X" symbols in the technical chart portion 8 of the folder 9 indicate an upward movement in the price of the stock, which prices are posted in a column at margin 16 near the crease 12 of the folder 9. "O" symbols in the technical chart portion 8 of the folder 9 indicate a downward movement in the price of the stock.

Characters A and B 17 on the technical chart portion 8 of the folder 9, which are chronologically interspaced among symbols 14 and 15, indicate that the operator should pull out the fundamental chart 11 to positions 18 and 19, and so on, as these characters 17 are uncovered by the slide 5 as the operator proceeds to use the machine.

Folder 9 contains the technical information chart 8 and the fundamental information chart 11 pertaining to a particular stock selected for study. The information chart is authentic and is presented in the time sequence as the factors and happenings actually occurred so as to make the practice and study as realistic as possible.

The operator uses the machine as follows:

Being careful not to open the folder 9 and thus prematurely expose the contents thereof, he places the folder 9 in his left hand and with his right hand lifts the clear plastic cover sheet 3 attached to the chart board 1.

He then inserts the plastic sheet 3 between the technical chart portion 8 and the envelope 10 containing the fundamental information chart 11, opening the folder 9 only wide enough to permit it to slide over the plastic sheet 3. The crease 12 of the folder 9 will rest against the left edge of the plastic sheet 3.

The folder 9 is worked down until the bottom edge 13 rests next to the upper edge of the raised strip 7 at the bottom of the chart board 1. The operator then lifts the cover of the folder 9 only enough to allow the cover board 4 to be placed between the plastic sheet 3 and the top sheet of the folder 9. The cover board 4 is now resting on top of the plastic sheet 3 and hides from view the technical information chart 8 on the folder 9 which rests under the plastic sheet 3. The fundamental chart 11 in envelope 10 of folder 9 rests on top of the cover board 4.

The operator now opens the folder 9 so that the fundamental chart 11 in envelope 10 falls to the left of the machine, exposing the cover board 4 resting on top of the plastic sheet 3. Cover board 4 still hides the technical information chart 8 from the view of the operator.

The operator then moves the cover board 4 to the right until the first vertical column of symbols 14 is exposed. As a preliminary move, he now slowly pulls the information chart 11 from the envelope 10 until he sees the word "STOP." The information chart 11 gives preliminary basic fundamental information about the particular stock under study. Subsequently, as he uncovers characters 17 he again pulls the information chart 11 slowly from the envelope 10 until he sees the word "STOP." Such movements give the operator the fundamental news and information concerning the particular stock under study that were issued coincident with the time sequence point at which the character 17 is exposed on the technical chart 8.

The slide 5 is moved up so as to expose all of the symbols 14 in the first column of the technical information chart 8. By reference to the price scale 16, on the left margin, the operator now knows the first upward price movement of the particular stock under study. The next column of symbols 15 shows the downward movement and this column is exposed by moving the cover board 4 to the right the width of one vertical column. The operator now moves the slide 5 on the cover board 4 so that the bottom edge just covers the bottom symbol of the column 15 and hides from view this entire column. He again moves the cover board 4 to the right the width of one column. This exposes the symbols 15 again but hides from view the symbols in the columns to the right. He moves the slide 5 upwards so as to expose one symbol at a time.

Eventually the operator moves the slide upward and finds no symbol remaining in that column. At this point the operator has reached the top of the upward price movement for that particular column. Before moving the cover board 4 one column to the right, the operator moves slide 5 down so that the upper edge just covers the highest symbol in that particular column. He then moves the cover board to the right the width of one vertical column and slide 5 covers the symbols in the next column from his view. The operator then begins moving slide 5 down so as to expose one symbol at a time. This reveals an actual downward price movement of the particular stock under study. Eventually the operator moves the slide down and finds no symbol remaining in that column. At this point the operator has reached the bottom of the downward price movement for that particular column.

This operation is continued by the operator until he feels that from an analysis of the fundamental and technical information revealed to him, he is willing at a particular point to make a decision to buy, sell short, or hold his position as he would actually do if he were following the same stock performing in the stock market, except that the element of time is condensed and, in a relatively short period of time, the operator can run through a sequence of events which actually took a long time to develop.

As the machine continuously feeds or reveals the information to the operator and he occasionally makes decisions, the wisdom of his judgment will be tested by the subsequent price movements of the stock under study. Continuous practice with a number of different folders 9, each representing a realistic case history of a particular stock, will allow the operator to gain the skill in decision making in a matter of hours that would normally take years to develop.

From the foregoing it will be seen that due to the use of the invention shown and described, I have provided a machine which allows an individual to rapidly gain skill in the interpretation of fundamental and technical information as it pertains to the making of decisions for the purchase, sale, holding, short selling, placing of buy and stop loss orders, and put and call options. It is obvious that with this invention the operator can practice using actual case histories of particular stocks without having stock information revealed or made known to him except as it occurred chronologically during the price movements under study.

It is also obvious that while the subject study machine has been described with reference to analyzing security transactions, it would clearly be within the scope of the invention to utilize said machine for analyzing other kinds of time correlated data. For example, the columnar information on the charts of the invention could relate to factory production information or the like. Further, the actual mechanical parts can be changed without changing the spirit of the invention.

Having thus described the invention, what is claimed is:

1. In a study machine, a chart having thereon a plurality of spaced, parallel columns substantially identical in width and each containing a plurality of symbols, an opaque cover means receivable on said chart and movable with respect thereto in a direction perpendicular to said columns, said cover means including a straight edge disposed parallel to said columns, at least one opaque slide disposed on said cover means and projecting beyond said straight edge a distance slightly greater than the width of one of said columns, and means connecting said slide to said cover means and arranged to permit translational movement of said slide relative to said cover means only in a direction parallel to said straight edge, said connecting means comprising an elongated slot in one of said slide and said cover means and a tongue on the other thereof, said slot extending parallel to said edge and said tongue being received therewithin for sliding translational movement, said tongue and said slot being shaped so that when the former is disposed within the latter said slide and said cover means are interlocked.

2. The combination as recited in claim 1, wherein said cover means has a second straight edge thereon, extending perpendicularly to said first mentioned straight edge, and including additionally a base having a raised straight edge thereon, said chart being receivable on said base with said columns extending perpendicularly to said raised edge, and said cover means being receivable on said base over said chart and with said second straight edge in engagement with said raised straight edge.

3. A device for use in studying time correlated data, comprising a first chart having thereon in chronological sequence a plurality of spaced items of fundamental information about the data being studied, each said item having an identifying character associated therewith, means mounting said first chart and arranged to disclose in chronological sequence said items when said first chart is manipulated relative to said means, a second chart associated with said first chart and having thereon a plurality of parallel columns containing symbols interspersed with individual characters corresponding to those utilized on said first chart, each of said symbols in said columns indicating a particular point in time for said data being studied, opaque cover means receivable over said second chart for obscuring said columns from view, said cover means including a straight edge disposed parallel to said columns, and said cover means and said second chart being moveable relative to each other in a direction perpendicular to said columns, and opaque slide means mounted on said cover means by connecting means, and moveable with respect to both said cover means and said second chart, said opaque slide means projecting beyond said straight edge a distance at least equal to the width of one of said columns, and said connecting means including: an elongated slot in one of said slide means and said cover means and a tongue on the other thereof, said slot extending parallel to said edge and said tongue being received therewithin for sliding translational movement, said tongue and said slot being shaped so that when the former is disposed within the latter said slide means and said cover means are interlocked.

4. A device as recited in claim 3, wherein the symbols comprising alternate columns are identical in configuration, the symbols in one column indicating an upward value movement and the symbols in an adjacent column indicating a downward value movement, and wherein said characters are each positioned in said columns to correspond chronologically with a particular value.

5. A device as recited in claim 3, wherein said data being studied comprises transactions relating to a particular security, and including additionally a scale on said second chart disposed parallel to said columns and containing security price indicia arranged in numerical order, and wherein the symbols comprising alternate columns are identical in configuration, the symbols in one column indicating an upward price movement and the symbols in an adjacent column indicating a downward price movement for the particular security being studied.

References Cited by the Examiner

UNITED STATES PATENTS

| | | | |
|---|---|---|---|
| 1,954,033 | 4/1934 | Adams | 120—33 |
| 2,305,972 | 12/1942 | Lorber | 35—48.1 |
| 2,498,854 | 2/1950 | Hazel | 35—9 X |
| 2,523,803 | 9/1950 | Adams | 282—29.1 |
| 3,021,612 | 2/1962 | Palmer | 35—9 |

EUGENE R. CAPOZIO, *Primary Examiner.*

ABRAHAM BERLIN, LAWRENCE CHARLES, JEROME SCHNALL, *Examiners.*